(12) United States Patent  
Brown et al.

(10) Patent No.: US 8,249,301 B2  
(45) Date of Patent: Aug. 21, 2012

(54) VIDEO OBJECT CLASSIFICATION

(75) Inventors: Lisa Marie Brown, Pleasantville, NY (US); Longbin Chen, Sunnyvale, CA (US); Rogerio Schmidt Feris, White Plains, NY (US); Arun Hampapur, Norwalk, CT (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/200,017

(22) Filed: Aug. 28, 2008

(65) Prior Publication Data

US 2010/0054535 A1 Mar. 4, 2010

(51) Int. Cl.
*G06K 9/00* (2006.01)
*H04N 5/225* (2006.01)

(52) U.S. Cl. ....................... 382/104; 348/169
(58) Field of Classification Search .................. 382/103, 382/104, 107, 190, 239; 348/169, 170, 171, 348/172, 208.14, 69, 91, 739
See application file for complete search history.

(56) References Cited

U.S. PATENT DOCUMENTS

| | | | | |
|---|---|---|---|---|
| 6,574,353 | B1 * | 6/2003 | Schoepflin et al. | 382/103 |
| 7,391,907 | B1 * | 6/2008 | Venetianer et al. | 382/224 |
| 7,457,435 | B2 * | 11/2008 | Pace | 382/103 |
| 7,593,547 | B2 * | 9/2009 | Mittal et al. | 382/103 |
| 7,639,840 | B2 * | 12/2009 | Hanna et al. | 382/103 |
| 7,657,100 | B2 * | 2/2010 | Gokturk et al. | 382/209 |
| 7,986,828 | B2 | 7/2011 | Rao et al. | |
| 2006/0083423 | A1 | 4/2006 | Brown et al. | |
| 2007/0070190 | A1 | 3/2007 | Yin et al. | |

OTHER PUBLICATIONS

B. Bose et. al., "Improving Object Classification in Far-Field Video," IEEE Computer Society Conference on Computer Vision and Pattern Recognition, Jun.-Jul. 2004, pp. 1-8, vol. 2.
L.M. Brown, "View Independent Vehicle/Person Classification," ACM 2nd International Workshop on Video Surveillance and Sensor Networks, Oct. 2004, pp. 114-123.
N. Dalal et al., "Histograms of Oriented Gradients for Human Detection," IEEE Computer Society Conference on Computer Vision and Pattern Recognition, 2005, pp. 886-893.
A. Elgammal et al., "Non-Parametric Model for Background Subtraction," Sixth European Conference on Computer Vision, 2000, pp. 751-767.
H. Grabner et al., "On-Line Boosting and Vision," IEEE Computer Society Conference on Computer Vision and Pattern Recognition, 2006, pp. 260-267.
O. Javed et al., "A Hierarchical Approach to Robust Background Subtraction Using Color and Gradient Information," Workshop on Motion and Video Computing, Dec. 2002, pp. 22-27.
O. Javed et al., "Tracking and Object Classification for Automated Surveillance," Seventh European Conference on Computer Vision, May 2002, pp. 343-357.

(Continued)

*Primary Examiner* — Abolfazl Tabatabai
(74) *Attorney, Agent, or Firm* — Anna Linne; Ryan, Mason & Lewis, LLP

(57) ABSTRACT

Techniques for classifying one or more objects in at least one video, wherein the at least one video comprises a plurality of frames are provided. One or more objects in the plurality of frames are tracked. A level of deformation is computed for each of the one or more tracked objects in accordance with at least one change in a plurality of histograms of oriented gradients for a corresponding tracked object. Each of the one or more tracked objects is classified in accordance with the computed level of deformation.

18 Claims, 7 Drawing Sheets

OTHER PUBLICATIONS

S. Lazebnik et al., "Beyond Bags of Features: Spatial Pyramid Matching for Recognizing Natural Scene Categories," IEEE Computer Society Conference on Computer Vision and Pattern Recognition, 2006, pp. 2169-2178, vol. 2.

A.J. Lipton, "Local Application of Optic Flow to Analyse Rigid Versus Non-Rigid Motion," CMU Technical Report, CMU-RI-TR-99-13, Dec. 1999, 13 pages.

D.G. Lowe, "Distinctive Image Features from Scale-Invariant Keypoints," International Journal of Computer Vision, Nov. 2004, pp. 91-110, vol. 60, No. 2.

H. Schneiderman et al., "A Statistical Method for 3D Object Detection Applied to Faces and Cars," IEEE Computer Society Conference on Computer Vision and Pattern Recognition, Jun. 2000, 6 pages.

A. Senior, "Tracking People with Probabilistic Appearance Models," ECCV Workshop on Performance Evaluation of Tracking and Surveillance Systems, Jun. 2002, pp. 48-55.

P. Viola et al., "Detecting Pedestrians Using Patterns of Motion and Appearance," International Journal of Computer Vision, Feb. 2005, pp. 153-161, vol. 63, No. 2.

B. Wu et al., "Tracking of Multiple, Partially Occluded Humans Based on Static Body Part Detection," IEEE Computer Society Conference on Computer Vision and Pattern Recognition, 2006, pp. 951-958.

L. Zhang et al., "Real-Time Object Classification in Video Surveillance Based on Appearance Learning," IEEE Computer Society Conference on Computer Vision and Pattern Recognition, Jun. 2007, pp. 1-8.

* cited by examiner

100

800

900

VIDEO OBJECT CLASSIFICATION

CROSS-REFERENCE TO RELATED APPLICATION

This application is related to the concurrently filed U.S. patent application Ser. No. 12/200,059, and entitled "Calibration of Video Object Classification," the disclosure of which is incorporated by reference herein.

FIELD OF THE INVENTION

The present invention relates generally to video analysis, and more particularly, to object classification.

BACKGROUND OF THE INVENTION

The advent of digital video, network cameras, and networked video recorders has resulted in a new generation of smart surveillance systems. These systems utilize analytic modules in connection with computer vision techniques to automatically extract useful information from surveillance videos. Smart surveillance systems may provide users with real-time surveillance alerts, in addition to, enabling users to easily search over surveillance data.

Visual object classification is a key component of smart surveillance systems. The ability to automatically recognize objects in images is essential for a variety of surveillance applications, such as the recognition of products in retails stores for loss prevention, automatic identification of vehicles and vehicle license plates, recognition of one or more persons of interest, etc. However, object classification using conventional techniques continues to be very challenging.

Over the past several decades, many different approaches have been proposed to automatically classify objects in images and videos. For example, bag of words and scale-invariant feature transform (SIFT) features have been popular methods for large-scale classification problems involving multiple object classes. However, these techniques are designed to handle still images with high resolutions and are not appropriate to classify moving objects in low resolution surveillance videos. See, e.g., D. Lowe, "Distinctive Image Features From Scale-Invariant Keypoints," IJCV, Vol. 60, No. 1, pp. 91-110, 2004; and S. Lazebnik et al., "Beyond Bags of Features: Spatial Pyramid Matching for Recognizing Natural Scene Categories," In CVPR, 2006. Other techniques involve scanning entire video frames by applying specialized detectors, such as pedestrian or car detectors, at an image location. See, e.g., P. Viola et al., "Detecting Pedestrians Using Patterns of Motion and Appearance," In ICCV, 2003; N. Dalal et al., "Histograms of Oriented Gradients for Human Detection," In CVPR, 2005; and H. Schneiderman et al., "A Statistical Method for 3D Object Detection Applied for Faces and Cars," In CVPR, 2000. However, these approaches often require excessive amounts of training data to learn robust classifiers and suffer from object pose variability.

In general, conventional object classification systems are inefficient at real-time processing and require high memory consumption. Further, conventional systems cannot handle arbitrary camera views, such as different view angles and zooms, which may cause variations in object appearance, shape, and speed; conventional classification techniques require a static camera view which allows for easy differentiation between a background image and moving objects. Conventional classification techniques also have difficulty discerning objects under various illumination conditions and have difficulty handling strong shadow effects, which may distort the size of objects. Furthermore, conventional techniques have difficulty distinguishing groups of people from vehicles, which may have similar shapes and sizes in the same camera view.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for improving the accuracy of classifying objects in a video.

For example, in one embodiment of the invention, a technique for classifying one or more objects in at least one video, wherein the at least one video comprises a plurality of frames, is provided. One or more objects in the plurality of frames are tracked. A level of deformation is computed for each of the one or more tracked objects in accordance with at least one change in a plurality of histograms of oriented gradients for a corresponding tracked object. Each of the one or more tracked objects is classified in accordance with the computed level of deformation.

A level of deformation may be computed by computing a plurality of histograms of oriented gradients for a given tracked object in the plurality of frames. At least one change in the plurality of histograms of oriented gradients may be detected over the plurality of frames for the given tracked object. A level of deformation for the given tracked object may be calculated using a weighted function. A variable of the weighted function may be the at least one detected change in the plurality of histograms of oriented gradients over the plurality of frames.

In a second embodiment of the present invention, a system for classifying one or more objects in at least one video is presented. The system comprising: an input component for obtaining the at least one video, such that the at least one video comprises a plurality of frames; a feature extractor for tracking one or more objects in the plurality of frames and computing a level of deformation for each of the one or more tracked objects in accordance with at least one change in a plurality of histograms of oriented gradients for a corresponding tracked object; an object classifier for classifying each of the one or more tracked objects in accordance with the computed level of deformation; an adaptation component for adjusting a class of a given tracked object in accordance with a time of day, an environment, and/or an observation that the given tracked object belongs to a specific class; and a calibration tool for calibrating a classification of the one or more tracked objects by partitioning at least one view associated with the at least one video into at least one region, such that the one or more tracked objects are classified in accordance with their location in reference to the at least one region, and/or defining at least one normalized size of the one or more tracked objects within at least one view associated with the at least one video in accordance with one or more object models, such that the one or more tracked objects are classified in accordance with the at least one defined normalized size.

In additional embodiments, the above techniques for classifying one or more objects in at least one video may be carried out by an apparatus and/or a computer program product. These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods for classifying one or more objects in at least one video. Specifically, the present disclosure will illustrate techniques for identifying persons and vehicles in a surveillance video using a computed level of deformation. It should be understood, however, that the invention is not limited to the particular embodiments described herein. The principles of this invention are generally applicable to the classification of any object (e.g., animate or inanimate) in any visual image. Modifications to the illustrative embodiments will become apparent to those skilled in the art given the teachings described herein.

The term "histogram" as used herein is intended to be construed broadly so as to encompass, by way of example and without limitation, any graph of tabulated frequencies. A "histogram of oriented gradient" as described in conjunction with the present invention refers to a graph of tabulated image intensity gradients for a particular image.

The term "level of deformation" as used herein is intended to be construed broadly so as to encompass, by way of example and without limitation, a degree of change in the form (i.e., shape) of an object.

The present invention proposes to classify one or more objects in a video by utilizing differences of histograms of oriented gradients (DHoG). DHoGs reflect the amount of deformation of an object (i.e., level of deformation) over one or more frames in a video. In one exemplary embodiment, DHoGs may be used to differentiate vehicles from people because the level of deformation of a person is higher than the level of deformation of a vehicle. For example, the movement of a person or group of persons may be described as dynamic and elastic (i.e., many moving body parts) as opposed to the movement of a vehicle which may be described as very rigid (i.e., a moving box).

Figure 1:
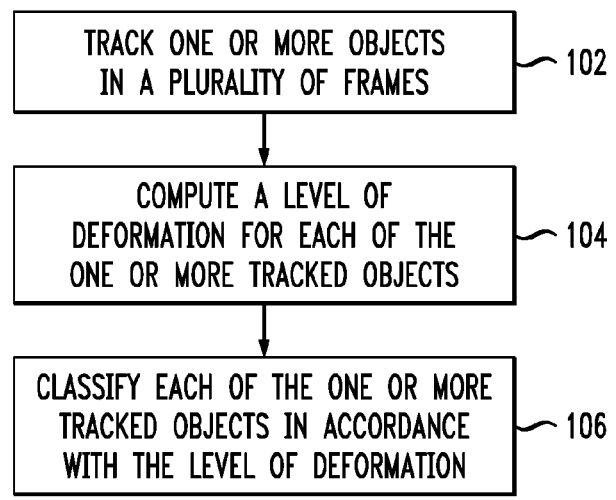
FIG. 1 is a flow diagram illustrating an exemplary methodology for classifying one or more objects in at least one video, according to an embodiment of the present invention.

Referring initially to FIG. 1, a flow diagram illustrates an exemplary methodology for classifying one or more objects in at least one video, according to an embodiment of the present invention. Methodology 100 may be carried out by a computer-based device, such as a server. Methodology 100 begins at step 102, where one or more objects in a plurality of video frames are tracked. The video frames may be obtained from one or more cameras (e.g., video cameras) coupled to the computer-based device. At step 104, a level of deformation for each of the one or more tracked objects is computed. In an exemplary embodiment, the level of deformation of a tracked object may be determined by detecting changes/differences in a plurality of histograms of oriented gradients (HoG) computed for the tracked object. The details of computing the level of deformation for an object using HoGs will be described in greater detail below in Section I: Feature Extraction. At step 106, each of the one or more tracked objects is classified in accordance with the computed level of deformation. In an exemplary embodiment, the classification step may be carried out in accordance with additional object features such as size, velocity, and location, as will be described below in Section II: Object Classification.

Object deformation information derived from HoGs may, alone, provide sufficient information for object classification. However, the accuracy of object classification may be substantially increased by applying additional object classification factors and techniques. Therefore, the steps of methodology 100 may be best described in accordance with an exemplary object classification system. For illustrative purposes, the exemplary object classification system, which will be described below, will illustrate the classification of people and vehicles; however, it is to be appreciated that the proposed system and techniques may be used to classify other objects as well and is not limited to the classification of only people and vehicles.

The proposed object classification system is meant to handle the challenging real-world conditions of video surveillance. Real-world conditions may include the presence of shadows, low resolution imagery, perspective distortions, arbitrary camera viewpoints, and groups of objects such as crowds of people. Unlike conventional classification systems, the proposed system may operate in real-time (30 Hz) on conventional machines with low memory consumption.

In an exemplary embodiment, an object classification system may comprise four general processes/components: (1) extraction of discriminative features; (2) object classification; (3) an adaptation process; and (4) an interactive interface. All four processes/components may be integrated by means of a probabilistic framework.

In the extraction of discriminative features, conventional object features such as object size and velocity are extracted from an object. In addition to these features, differences of histograms of oriented gradients (DHOG) are computed, as described above, to measure the amount of deformation of an object (i.e., level of deformation) from one video frame to the next. DHoGs are especially useful in differentiating vehicles from people under different camera views and/or scenes with shadows. Further, DHoGs allow for better discernment between groups of people and vehicles, which, visually, have similar shapes and sizes. DHoGs will be described in greater detail below in Section I: Feature Extraction.

Object classification involves classifying one or more objects in a video into one or more object classes (e.g., people, vehicles, etc.). In an illustrative embodiment, object classification is a probability computation (i.e., the probability that an object belongs to a particular class). The classification of an object may be in accordance with an object's extracted features such as, size, velocity, location, and level of deformation. Object classification will be described in greater detail below in Section II: Object Classification.

The adaptation process may comprise updating the classification parameters of object classification as new object data is extracted. The adaptation process is meant to improve the classification accuracy of an object classification system over various camera views. The adaptation process will be described in greater detail below in Section III: Adaptation Process.

The interactive interface allows a user to calibrate the object classification process. In one embodiment, the user may specify regions of interest (ROI) for a specific object class (e.g., person, vehicle, etc.). An ROI defines a location in a camera view in which an object is or is not likely to be present. This information may affect how an object is classified. For example, if an object is on a sidewalk, it is more likely that the object is a person rather than a vehicle. In another embodiment, a user using the interactive interface may define "normal" object sizes at different locations within a camera view to correct perspective distortions. Information gathered through the interface may allow the classification system to operate from arbitrary camera angles and may significantly improve object classification accuracy. The interactive interface will be described in greater detail below in Section IV: Interactive Interface.

Figure 2:
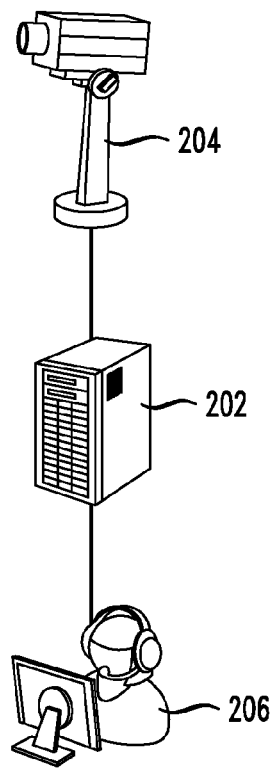
FIG. 2 is a diagram illustrating one general implementation for employing the proposed techniques, according to an embodiment of the present invention.

Referring now to FIG. 2, a diagram illustrates one general implementation for employing the proposed techniques, according to an embodiment of the present invention. In an exemplary embodiment, the classification of one or more objects in at least one video may be carried out by any computer-based device, such as a server 202. The server 202 may be coupled to one or more cameras 204 (e.g., video cameras). The one or more cameras 204 collect and transmit visual data of an environment (e.g., an area under surveillance) to the server 202. The server 202 then processes the data and classifies one or more objects within the visual data. The extraction of discriminative features, object classification, and the adaptation process, described above, may be carried out at server 202. The server 202 generates object classification data which may be used to carry out high-level tasks, such as event detection (e.g., cars speeding, people loitering, security issues, etc.) and searches (e.g., finding vehicles of interest and/or persons of interest, etc.).

The server 202 may also be coupled to one or more displays and/or terminals 206, which provides one or more users the ability to interface with the object classification system. For example, the one or more displays and/or terminals 206 may facilitate the interactive interface described above. Furthermore, the one or more displays and/or terminals 206 may be used by the server 202 to alert the one or more users of a particular event (i.e., event detection). Or, the one or more users may use the one or more displays and/or terminals 206 to search through the classified objects for objects of interest. It is to be appreciated that the uses for object classification data are not limited to these particular examples and that the generated object classification data may be used to carry out any number of tasks.

I. Feature Extraction

Discriminative object feature extraction is the basis for object classification. Given the limited computational resources and real-time requirement in practical video surveillance applications, the extracted features used for object classification are preferably low cost and efficient for computation. In one embodiment, four object track features may be utilized. Two of these features, object size and velocity direction, are view-dependent and are extracted from background subtraction (BGS) and object tracking results. BGS is known to a person having ordinary skill in the art. See, e.g., A. Elgammal et al., "Non-Parametric Model for Background Subtraction," In ECCV, 2000; and O. Javed et al., "A Hierarchical Approach to Robust Background Subtraction Using Color and Gradient Information," In WMVC, 2002, the disclosures of which are incorporated by reference herein. Object tracking is also known to a person having ordinary skill in the art. See, e.g., A. Senior, "Tracking With Probabilistic Appearance Models," In PETS, 2002; and B. Wu et al., "Tracking of Multiple, Partially Occluded Humans Based on Static Body Part Detection," In CVPR, 2006, the disclosures of which are incorporated by reference herein.

Object size is a distinctive classification feature which may be used to differentiate between objects of different classes. For example, a single person may be distinguished from a vehicle because people possess much smaller shapes than vehicles at the same location in a particular camera view. Furthermore, the sizes of persons are more consistent and there is less size variance between people as an object class as compared to vehicles. The size of an object at a particular frame i, denoted $s_i$, may be computed as the area of the corresponding foreground motion blob. The size vector of the track of an object may be defined as $s=(s_0, s_1, \ldots, s_n)$, where $s_0$ is the object's size at a starting point in a video track.

The velocity direction of an object is another distinctive classification feature. For example, at a street-intersection, pedestrians typically walk along the zebra-crossings, which are perpendicular to vehicle movements. In an illustrative embodiment, the velocity direction measurement of an object may be equally discretized into 20 bins. The velocity of an object at frame i may be denoted as $v_i$, and similar to the size vector described above, the velocity vector of the track of an object may be defined as $v=(v_0, v_1, \ldots, v_n)$, where $v_0$ is the object's velocity at a starting point in the video track.

In addition to size and velocity, an object location feature may also be extracted. The location of an object at frame i may be denoted as $x_i$. The location of an object in relation to the object's surrounding environment may help in object classification. In an exemplary embodiment, object location is analyzed together with ROIs, which may be set by a user through the interactive interface; ROIs will be described below in greater detail in Section IV: Interactive Interface. ROIs define locations in a camera view where objects of a class (e.g., person, vehicle, etc.) are or are not likely to appear in relation to an object's centroid. For example, an object located in an area where vehicles seldom appear, such as a walkway and/or a building entrance, is most likely a person or group of persons. The location vector of an object may be defined as $x=(x_0, x_1, \ldots, x_n)$, where $x_0$ is the object's location at a starting point in the video track.

In addition to object size, object velocity, and object location, the proposed techniques for object classification extract a view-independent feature referred to as Differences of Histograms of Oriented Gradients (DHoG). A DHoG models the intra-object deformation (e.g., level of deformation of an object) in a temporal domain. By nature, DHoGs are invariant to different camera views. DHoGs are useful for classification purposes because different classes of objects may possess a different level of deformation. For example, vehicles produce smaller DHoG than people since vehicles are more rigid when in motion. The DHoG feature is especially useful in distinguishing large groups of people from vehicles, which in many instances, have similar shapes and sizes.

As described above with reference to FIG. 1, computing a level of deformation for an object involves computing a plurality of HoGs for a tracked object and detecting changes in the HoGs over a plurality of video frames. In an illustrative embodiment, HoGs may be generated by processing an input video image with a foreground blob mask generated by a BGS module. In an exemplary embodiment, a HoG of an object is computed at every frame in a video track, and a DHoG Θ is calculated in terms of the difference between HoGs obtained in consecutive frames in terms of histogram intersection:

$$\Theta_i = 1 - \sum_j \min(HoG_i^j, HoG_{i-1}^j), \quad (1)$$

where j represents the bins in the oriented gradient histogram.

The DHoG of the entire object track is formulated using both spatial and temporal information of the track data. Here we introduce the concept of track distance, $T=\Sigma_{m=1}|x_m-x_{m-1}|$. This is used to normalize the incremental distance rather than the Euclidean distance between observations. The overall DHoG Θ is defined as the weighted mean of individual samples:

$$\Theta = \frac{\sum_{i=1}^n \Theta_i \times a_i}{L}, \quad (2)$$

where weight $a_i = |x_i - x_{i-1}|$ and the length of the entire object track $L = \Sigma_i a_i$.

The advantage of using the weighted mean is that the observed samples with low velocities do not contribute much in the overall DHoG modeling. This is critical in scenarios where people stand still for a long time after/before walking. In this case, since the person is being still, the frame-to-frame DHoG will be small due to small deformation. The weighted mean in this case will ignore these samples and only considers the samples with significant motion.

Figure 3A:
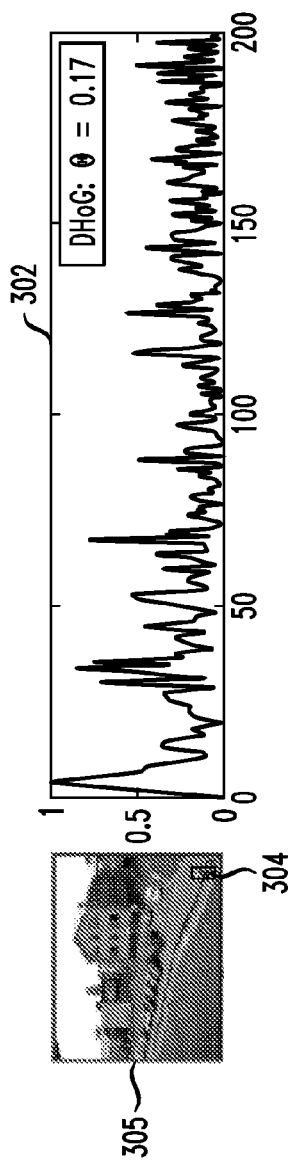
FIGS. 3A-C are diagrams illustrating three exemplary Differences of Histograms of Oriented Gradients plots for three types of objects, according to an embodiment of the present invention.
Figure 3B:
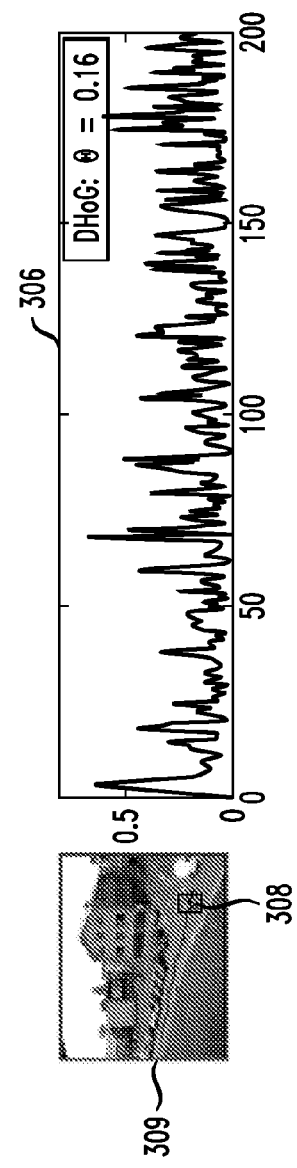
Figure 3C:
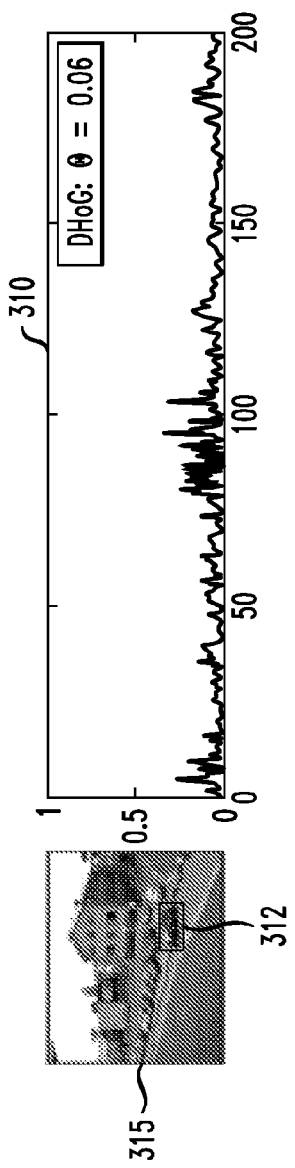

Referring now to FIGS. 3A-C, diagrams illustrate three exemplary DHoG plots for three types of objects according to an embodiment of the present invention. Each figure illustrates surveillance footage with a computed DHoG plot for a corresponding tracked object. The horizontal axis of each DHoG plot represents a video track length and the vertical axis of each DHoG plot represents the DHoG values. FIG. 3A illustrates a DHoG plot 302 for a person 304 in a surveillance video 305. FIG. 3B illustrates a DHoG plot 306 for a group of persons 308 in a surveillance video 309. FIG. 3C illustrates a DHoG plot 310 for a vehicle 312 in a surveillance video 313. The overall DHoG values Θ of a DHoG plot may represent the level of deformation of an object.

It should be noted that the level of deformation may be used to distinguish between people and vehicles because the level of deformation of a person or persons is much higher than the level of deformation of a vehicle. FIG. 3A illustrates that person 304 has an overall DHoG value Θ of 0.17. This is similar to the group of persons 308 of FIG. 3B, which has an overall DHoG value Θ of 0.16. In contrast, vehicle 312 has an overall DHoG value Θ of 0.06.

II. Object Classification

In an exemplary embodiment, the classification of a tracked object is a probability analysis. The object classification process may be viewed as a Maximum A Posterior (MAP) problem. Under this technique, classification is performed by analyzing the extracted features of an object (e.g., object size, object velocity, object location, and level of deformation) over an entire object track, i.e., a classification decision is made after the object track is finished. In one illustrative embodiment, let C be the class label of a target object, where C∈{P,V}; P stands for people and V stands for vehicles. The classification may be carried out by estimating the following probability, $$p(C|s,v,x,\Theta) = \frac{p(s,v,\Theta|x,C)p(x,C)}{p(s,v,x,\Theta)} \propto p(s,v,\Theta|x,C)p(x,C). \quad (3)$$

Let $M=(s, v, x, \Theta)$. Given the assumed object class C and its location vector x, the other three features, s (size vector), v (velocity vector) and Θ (overall DHOG), are considered independent to each other. Therefore, Equation 3 becomes the following:

$$P(C|M) \propto p(s|x,C)p(v|x,C)p(\Theta|x,C)p(x,C) \propto \quad (4)$$
$$\log p(s|x,C) + \log p(v|x,C) + \log p(\Theta|x,C) + \log p(x,C))$$

Since DHoG Θ models the self-variance of an object's appearance and is assumed to be independent from object location, Equation 4 is further derived to be, $$P(C|M) \propto \sum_{i=1}^n \log p(s_i|x_i,C) + \quad (5)$$
$$\sum_{i=1}^n \log p(v_i|x_i,C) + \sum_{i=1}^n \log[p(C|x_i)p(x_i)] + \log p(\Theta|C)$$

As a result, Equation 3 is decomposed into different likelihood and prior terms. Each of the likelihood and prior terms contribute to the probability that an analyzed object belongs to a particular object class (e.g., person, vehicle, etc.). To accommodate any perspective effect of the camera, the entire image field-of-view may be equally partitioned into a set of N blocks, each of which is represented by its center location $b_m$. Further, for the likelihood and prior terms that use the view-dependent features, e.g., size, velocity, and location, one or more distributions may be estimated and maintained for each image block N. It should be noted that the likelihood and prior terms may be initialized at the beginning of the object classification process and may be continuously updated using the adaptation process (Section III) as more object data is acquired and processed.

With regard to Equation 5, the size likelihood $p(s_i|x_i,C)$ may be specified by a Mixture of Gaussians model for each image block N. In an exemplary embodiment, two Gaussian models are utilized, one corresponding to a person class and one corresponding to a vehicle class. The initial values of the model parameters (mean and variance) may be specified by the user using the interactive interface which will be described in Section IV: Interactive Interface.

Figure 4:
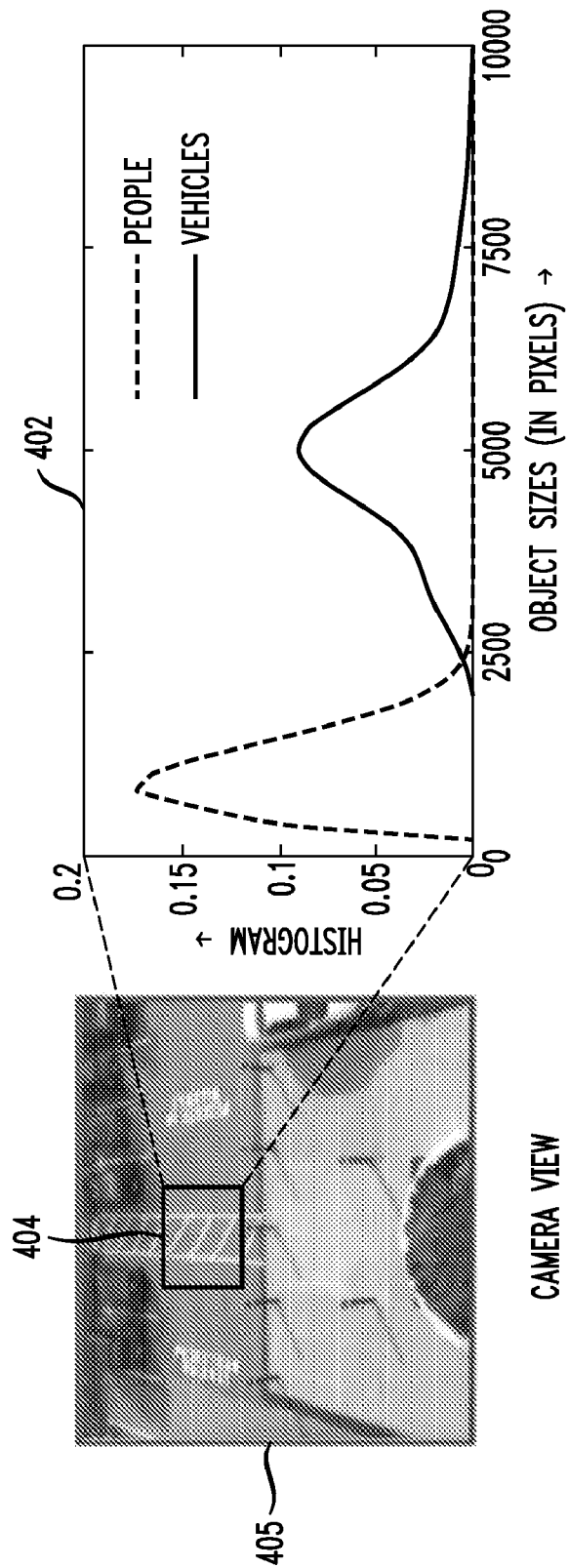
FIG. 4 is a diagram illustrating exemplary object size distributions for people and vehicles for a single camera view block, according to an embodiment of the present invention.

Referring now to FIG. 4, a diagram illustrates exemplary object size distributions for people and vehicles for a single camera view block, according to an embodiment of the present invention. As described above, a size likelihood may be specified by a user. Graph 402 illustrates object size distributions for people and vehicles for an image block 404 in camera view 405. In one example, if the size of an object in image block 404 falls within the size distribution for people in chart 402, the likelihood that the object is a person will be high. In contrast, if the size of an object in image block 404 is outside the size distribution for people and, furthermore, falls within the size distribution for vehicles, the likelihood that the object is a vehicle will be high.

Unlike object size, the velocity likelihood $p(\upsilon_i|x_i,C)$ may be initialized as uniformly distributed since there is little evidence to draw an inference of an appropriate parametric distribution to model object velocities. For instance, a person and a vehicle may move at the same speed in a video. However, the DHoG likelihood $p(\Theta|C)$ may be specified by using training data acquired from multiple views. Similar to the size likelihood, the DHoG likelihood may also be modeled by a Mixture of Gaussians.

Figure 5:
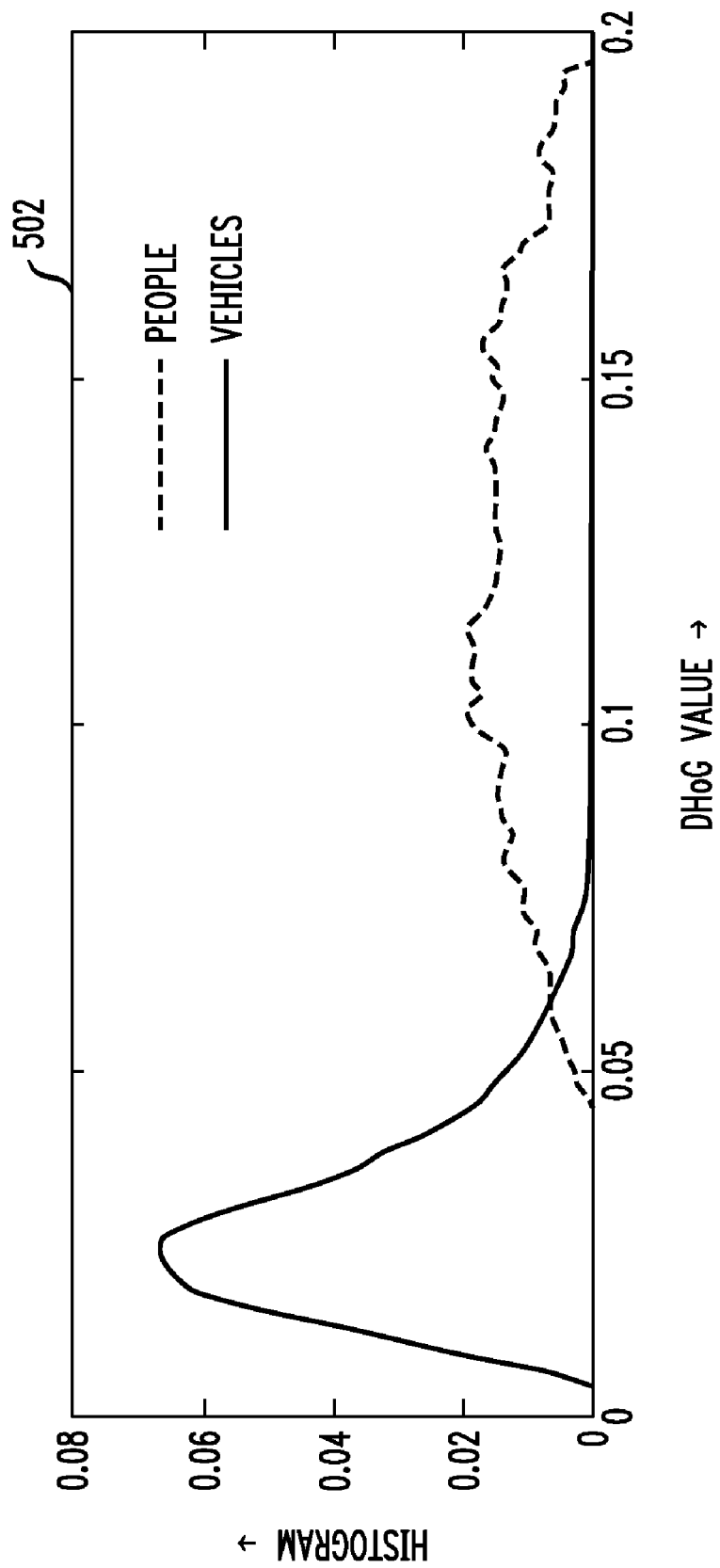
FIG. 5 is a diagram illustrating exemplary DHoG distributions for people and vehicles, according to an embodiment of the present invention.

Referring now to FIG. 5, a diagram illustrates exemplary DHoG distributions for people and vehicles, according to an embodiment of the present invention. Graph 502 illustrates two model DHoG distributions; one model distribution for people and one model distribution for vehicles. As discussed above in Section I, the overall DHoG values for people are higher in comparison to vehicles because the level of deformation of people and groups of people are higher than the level of deformation of vehicles.

The location likelihood $p(C|x_i)$ may be related to object ROIs. As will be discussed below in Section IV, an ROI may define a location in a camera view where a class of object (e.g., person, vehicle, etc.) is or is not likely to be present. In an exemplary embodiment, a location likelihood may satisfy the following conditions, $p(C_P|x_i) > p(C_V|x_i)$, if $x_i \in \{R_P\} \land x_i \notin \{R_V\}$, $p(C_P|x_i) \approx p(C_V|x_i)$, if $x_i \in \{R_P\} \land x_i \in \{R_V\}$, $p(C_P|x_i) > p(C_V|x_i)$, if $x_i \notin \{R_P\} \land x_i \in \{R_V\}$, (6)

where $\{R_P\}$ is the ROIs for people and $\{R_V\}$ is the ROIs for vehicles.

III. Adaptation Process

Object classification may be supplemented with an additional stage of refinement, which may be referred to as adaptation. In practice, specified prior information may not perform perfectly under varying camera views due to different viewing angles and/or unexpected lighting conditions. Therefore, feature adaptation may be critical to the object classification process. In an illustrative embodiment, adaptation may comprise two aspects: (1) adaptation to an environment of a camera view to accommodate different perspective effects; and (2) adaptation to particular time periods to handle different object classes in accordance with various periods of time (e.g., time of day).

In this section, we illustrate how to update the likelihood information of object features using newly acquired object samples. Object samples with high classification confidence values may be used to update likelihood values, i.e., $|p(C_P|M) - p(C_V|M)|$ is greater than a predefined threshold of confidence. For illustrative purposes, the adaptation process will be explained below with reference to an example for classifying people. A similar adaptation process may be carried out for vehicles and/or any other object.

In an exemplary embodiment, the adaptation process may be applied to the likelihood distributions of every image block N of a camera view. For example, once an object is confidently classified to be a person, its observation M at each frame is used to update the four likelihood terms (e.g., size, velocity, location, and DHOG) described above in Section II.

The size likelihood may be modeled using a Mixture of Gaussians with the mean $\bar{s}_P$ and variance, $\sigma_P^2$, $$\bar{s}_P = E(s_P) = \frac{1}{Z}\sum_k s_P^k, \quad (7)$$

$$\sigma_P^2 = E(s_P^2) - \bar{s}_P^2 = \frac{1}{Z}\sum_k (s_P^k)^2 - \bar{s}_P^2,$$

where Z is the total number of observed size samples for a person class.

It should be noted that if the terms $\Sigma_k s_P^k$ and $\Sigma_k (s_P^k)^2$ are calculated in an incremental fashion, there may be no need to store all the samples, which reduces memory consumption. The adaptation technique applied to size likelihood may also be applied to the DHoG likelihood $p(\Theta|C)$.

Adaptation of the velocity likelihood computation may be carried out by constructing an orientation histogram for the velocity likelihood $p(\upsilon|x,C_P)$ and updating the frequency values of the orientation histogram. For example, $p(\upsilon=v|x,C_P)=f(v|x,C_P)$, where $f(v|x,C_P)$ is the frequency of velocity direction v at image block x for the person class.

Unlike the adaptations for the above likelihoods, which are updated using an exact computation, adaptation of location likelihood may be carried out as an approximation. If an object is classified as a person, an update of a location likelihood may be defined as, $p^{new}(C_P|x) = \min[1, (-1-\alpha)p^{old}(C_P|x) + \alpha]$, (8)

$p^{new}(C_V|x) = (1-\alpha)p^{old}(C_V|x)$, where $\alpha$ is a fixed update factor.

Similarly, the same update schema may be applied when a vehicle is detected.

It should be appreciated that the fixed update factor $\alpha$ may be used to make the object classification system adapt to more recently acquired samples. By doing this, the classifier may also adapt to a temporal context of a camera view. This may be particularly useful in places where people and vehicles occupy the same area over different periods of time. For example, in a shopping area, only pedestrians are allowed to walk along the street during the daytime. However, after store closing, the number of people may be significantly reduced and loading/shipping vehicles may begin entering and leaving the monitored area. In this example, the fixed update factor $\alpha$ may bias the classification to classify an object as a vehicle during night time surveillance even if the object appears in a location that was pre-designated as an area where a person, rather than a vehicle, is more likely to be present (e.g., a people ROI).

IV. Interactive Interface

For prior information that is computed using view-dependent features (e.g., size, location, velocity, etc.), it is difficult for a user to calibrate the object classification system to every camera view. In this section, we present a graphical user interface (UI) tool which provides users an efficient way to specify appropriate calibration settings of the target camera view in an interactive way. In particular, the calibration tool helps the user initialize two likelihoods which were discussed previously in Section II: (1) $p(C|x_i)$, the probability of an object class at a given location in an image (e.g., location likelihood), and (2) $p(s_i|x_i,C)$, the probability of a tracked blob size given the object class and location (e.g., size likelihood). However, it should be appreciated that the calibration tool may be used independently and in conjunction with any imaging system, and is not limited to the embodiments of the object classification system described herein.

Figure 6A:
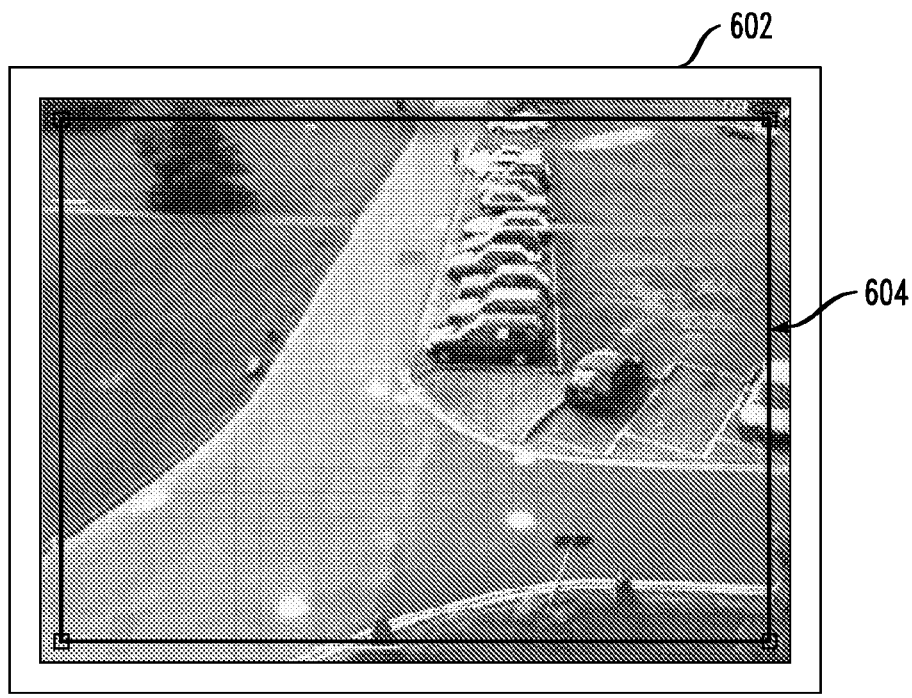
FIGS. 6A-B are diagrams illustrating an exemplary user interface tool for calibrating object classification by defining regions of interest, according to an embodiment of the present invention.
Figure 6B:
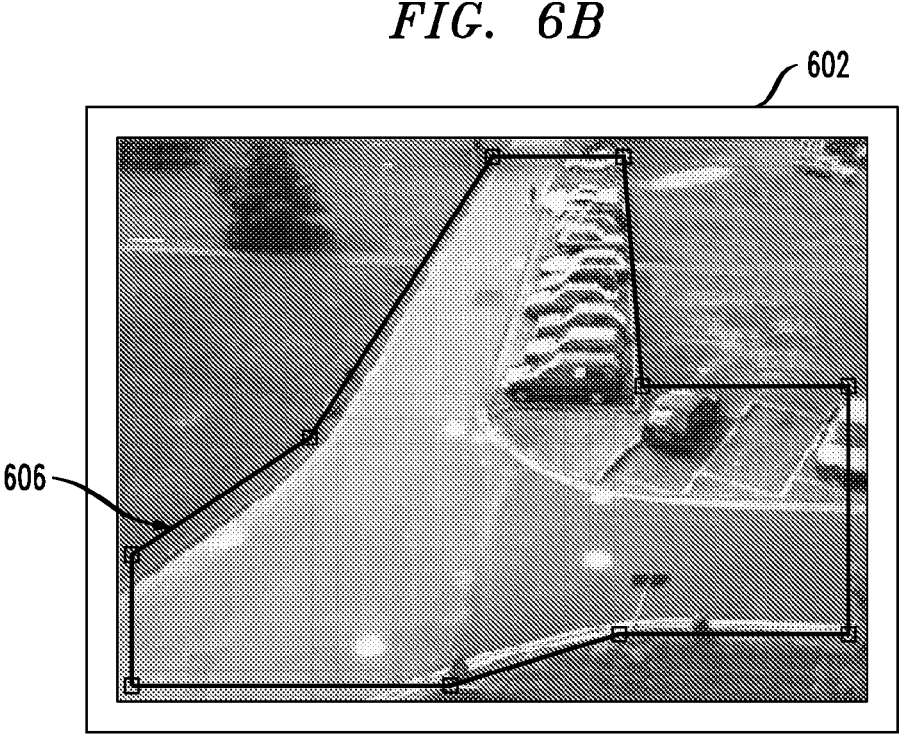

With regard to location likelihood, in many instances objects of a specific class are more likely to appear in certain regions in a camera view. For instance, in a city street environment, people usually walk along the sidewalk. On the other hand, vehicles mainly travel in the middle of a road. Therefore, a location of an object within an image may assist in the object classification process. In an exemplary embodiment, a calibration tool allows a user to specify the ROIs of an object class within a camera view. One or more ROIs for a specific class may be created, modified, and deleted as needed Referring now to FIGS. 6A-B, diagrams illustrate an exemplary user interface tool for calibrating object classification by defining regions of interest, according to an embodiment of the present invention. FIG. 6A depicts an image of a monitored area 602 comprising a quiet street intersection with a small parking area for vehicles and patches of adjacent grassland. A user via a user interface tool may select an ROI 604 where objects of a person class is or is not likely to be present. In this example, the user defines a person ROI 604 that encompasses the entire monitored area 602. By doing so, the user defines that there is a high likelihood that an object within ROI 604 is a person. In the alternative, in FIG. 6B, the user defines a vehicle ROI 606 that only encompasses the street and the small parking area for vehicles within monitored area 602. In this example, the user defines that there is a high likelihood that an object within ROI 606 is a vehicle.

In an exemplary embodiment, a calibration using ROIs may be carried out as follows. Let the label of an object class be $C_k$, $k \in \{P,V\}$ and its complement class be defined as $C_{k'}$. The ROIs of object class $C_k$ may be defined as $\{R_k\}$. Similarly, the ROIs for the complement object class is defined as $\{R_{k'}\}$. The location likelihood $p(C_k|x_i)$ of a given image location $x_i$ may be computed as follows, $p(C_k|x_i)=1.0$, if $x_i \in \{R_k\} \wedge x_i \notin \{R_{k'}\}$, $p(C_k|x_i)=0.5$, if $x_i \in \{R_k\} \wedge x_i \in \{R_{k'}\}$, (9)

$p(C_k|x_i)=0.0$, if $x_i \notin \{R_k\}$.

It should be noted that these likelihoods may be updated by the adaptation process. For instance, where tracked objects are classified into two classes, people ($C_P$) and vehicles ($C_V$), if a vehicle is detected in an exclusive ROI for people, likelihood $p(C_P|x)$ will be adjusted to a lower value and likelihood $p(C_V|x)$ will be increased.

Figure 7:
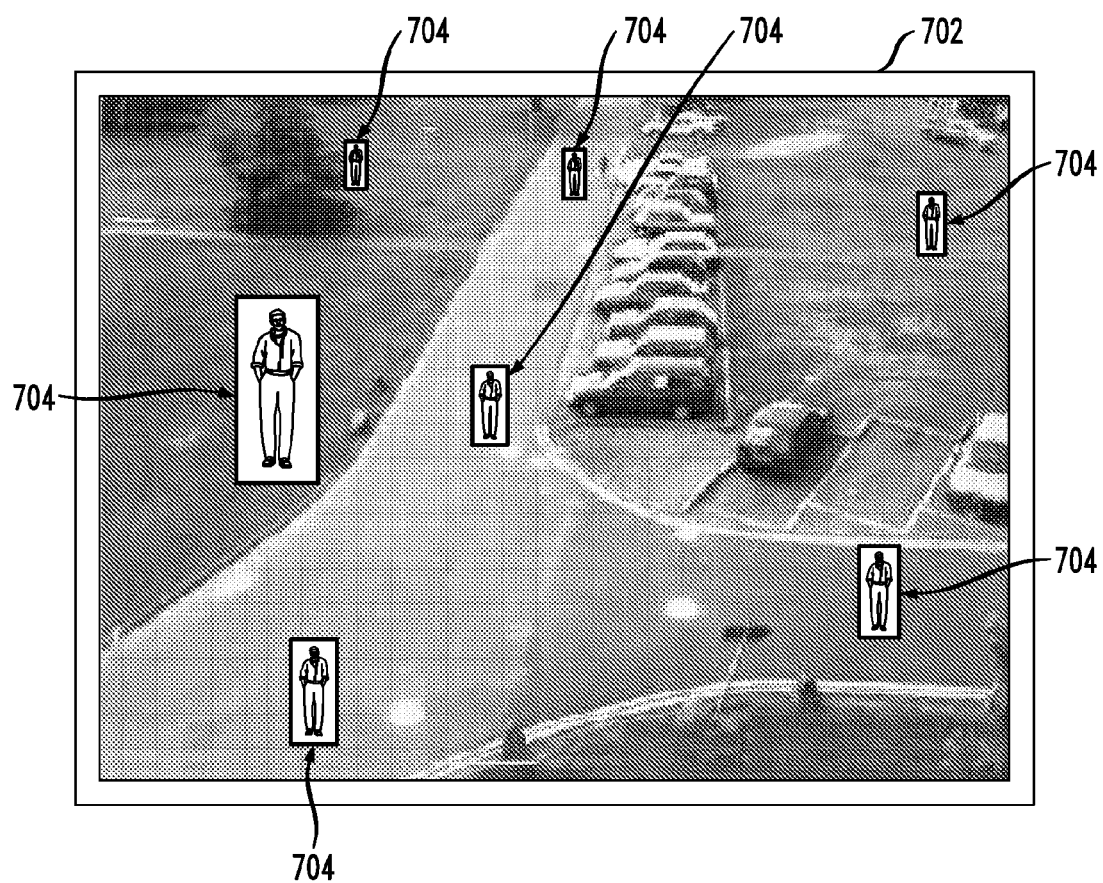
FIG. 7 is a diagram illustrating an exemplary user interface tool for calibrating object classification by introducing size models, according to an embodiment of the present invention.

With regard to size likelihood, a user using the calibration tool may define a normalized size of an object in a specific location within the camera view. Referring now to FIG. 7, a diagram illustrates an exemplary user interface tool for calibrating object classification by introducing size models, according to an embodiment of the present invention. The calibration tool is an easy and intuitive way to specify size information in the image field-of-view 702. FIG. 7 specifically depicts an incorporation of person size information; however, it should be appreciated that the calibration tool may be used to incorporate size information for other objects, such as vehicles. To obtain a size sample, the user may use the UI to add an object model to a specific location within the image 702. The model 704 may be moved to a desired location and resized to reflect an "appropriate" object size at a particular location within the field of view 702. In this example, the model 704 is a person.

FIG. 7 depicts multiple person size samples placed at different locations across the image 702. A person size sample may be denoted as $\hat{s}_m$, $m \in [1,M]$, where M is the total number of person size samples. The location of a size sample may be denoted as $\hat{x}_m$. To maximize effectiveness of the size calibration, a user may want to specify at least five size samples across an image. Once a sufficient number of size models are specified by the user through the calibration tool, a predicted size distribution for each image block of image 702 may be initialized by interpolating the size samples.

Given an image block $x_i$, its predicted mean person size $\bar{s}_i$ may be computed as, $$\bar{s}_i = \sum_{m=1}^{M} w_m \times \hat{s}_m, \qquad (10)$$

where $w_m$ is the interpolation weight for size sample $\hat{s}_m$. The computation should satisfy $$w_m \propto \frac{1}{\|x_i - \hat{x}_m\|} \text{ and } \sum w_m = 1.$$

Based on this interpolation, the object size likelihood at a given location for object classes, people ($C_P$) and vehicles ($C_V$), may be respectively defined as, $p(s_i|x_i,C_P)=N(s_i|\bar{s}_i,\sigma^2)$, (11)

$p(s_i|x_i,C_V)=N(s_i|\alpha\bar{s}_i,\sigma^2)$, (12)

where N (a|b, c) represents the probability of value a in a Gaussian distribution with mean of b and variance of c, and a is a scaling factor.

For initialization, scaling factor $\alpha$ and distribution variance $\sigma^2$ may be set to constant values for both classes (e.g., people and vehicles). It should be appreciated that the values of $\alpha$ and $\sigma^2$ may also be learned from previous empirical statistics. Furthermore, as described in Section III, the mean and variance of the object classes may be updated by the adaptation process.

Figure 8:
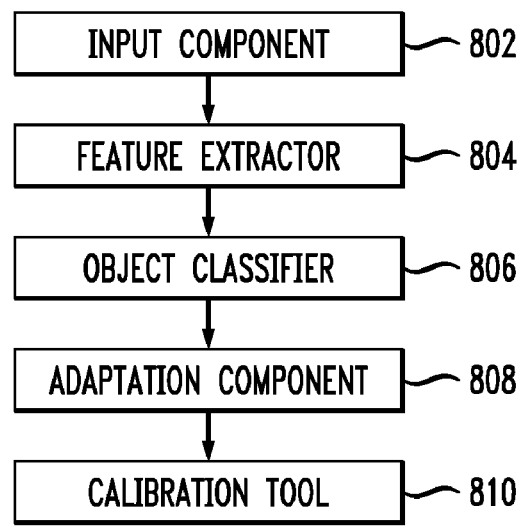
FIG. 8 is a system diagram illustrating exemplary components for an integrated system for object classification in a video, according to an embodiment of the present invention.

Referring now to FIG. 8, a system diagram illustrates exemplary components for an integrated system for object classification in a video, according to an embodiment of the present invention. System 800 may comprise an input component 802, a feature extractor 804, an object classifier 806, an adaptation component 808, and a calibration tool 810. Input component 802 may comprise one or more cameras (e.g., video cameras) as described with reference to FIG. 2. In one embodiment, the input component 802 obtains video footage of a monitored area, the video footage comprising one or more image frames. The feature extractor 804 carries out feature extraction as described above in Section I: Feature Extraction. In an exemplary embodiment, the feature extractor 804 may track one or more objects and compute a level of deformation for each of the one or more tracked objects. The object classifier 806 carries out object classification as described above in Section II: Object Classification. In one embodiment, the object classifier 806 may classify the one or more tracked objects in accordance with their computed levels of deformation, in addition to other extracted object features. The adaptation component 808 carries out adaptation as described above in Section III: Adaptation Process. In an illustrative embodiment, the adaptation component 808 may adjust the likelihood values of an object in accordance with a time of day, a surrounding environment of the object, and/or additional object data. The calibration tool 810 may be the user interface described above in Section IV: Interactive Interface. In an exemplary embodiment, the calibration tool 810 allows a user to calibrate the object classification process by defining ROIs and/or defining normalized object sizes.

Figure 9:
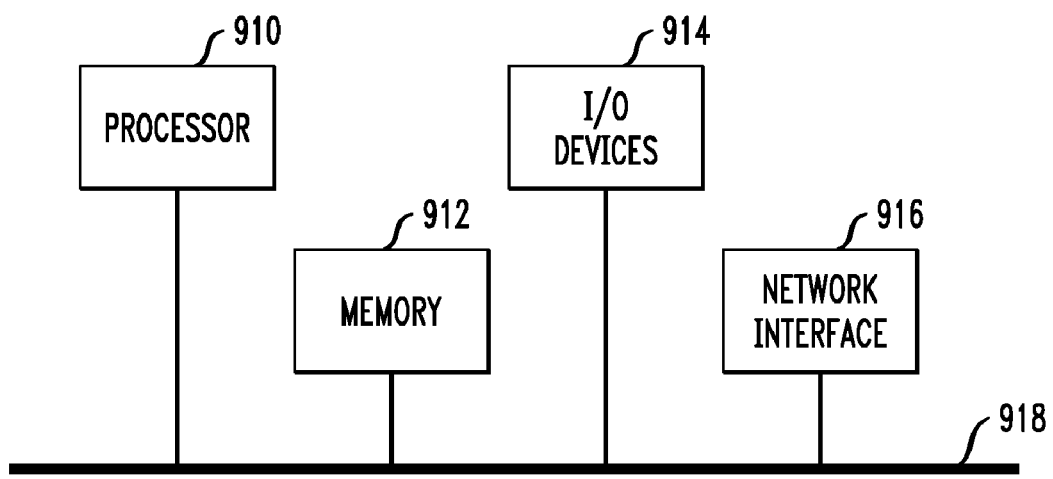
FIG. 9 is a diagram illustrating an illustrative hardware implementation of a computing system in accordance with which one or more components/methodologies of the present invention may be implemented, according to an embodiment of the present invention.

Referring now to FIG. 9, block diagram 900 illustrates an exemplary hardware implementation of a computing system in accordance with which one or more components/methodologies of the invention (e.g., components/methodologies described in the context of FIGS. 1-8) may be implemented, according to an embodiment of the present invention.

As shown, the techniques for classifying one or more objects in at least one video, wherein the at least one video comprises a plurality of frames, may be implemented in accordance with a processor 910, a memory 912, I/O devices 914, and a network interface 916, coupled via a computer bus 918 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer-readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for classifying one or more objects in at least one video, wherein the at least one video comprises a plurality of frames, the method comprising:
    tracking one or more objects in the plurality of frames;
    computing a level of deformation for each of the one or more tracked objects in accordance with at least one change in a plurality of histograms of oriented gradients for a corresponding tracked object; and
    classifying each of the one or more tracked objects in accordance with the computed level of deformation;
    wherein computing a level of deformation further comprises the steps of:
        computing a plurality of histograms of oriented gradients for a given tracked object in the plurality of frames;
        detecting at least one change in the plurality of histograms of oriented gradients over the plurality of frames for the given tracked object; and
        calculating a level of deformation for the given tracked object using a weighted function, such that a variable of the weighted function is the at least one detected change in the plurality of histograms of oriented gradients over the plurality of frames.

2. The method of claim 1, wherein a given tracked object is classified as at least one of a person and a vehicle.

3. The method of claim 1, further comprising the step of computing at least one of a size vector for each of the one or more tracked objects, a velocity vector for each of the one or more tracked objects, and a location vector for each of the one or more tracked objects.

4. The method of claim 3, wherein each of the one or more tracked objects are classified in accordance with a function of the size vector, the velocity vector, the location vector, and the level of deformation of a corresponding tracked object.

5. The method of claim 4, further comprising the step of adjusting a class of a given tracked object in accordance with at least one of a time of day, an environment, and an observation that the given tracked object belongs to a specific class.

6. The method of claim 1, wherein the weighted function accounts for one or more periods of non-movement of the given tracked object.

7. The method of claim 1, wherein the level of deformation of the given tracked object is compared to one or more object deformation models.

8. The method of claim 7, wherein the one or more object deformation models define a distribution of level of deformation for one or more object classes.

9. An apparatus for classifying one or more objects in at least one video, wherein the at least one video comprises a plurality of frames, the apparatus comprising:
    a memory; and
    at least one processor coupled to the memory and operative to: track one or more objects in the plurality of frames; compute a level of deformation for each of the one or more tracked objects in accordance with at least one change in a plurality of histograms of oriented gradients for a corresponding tracked object; and classify each of the one or more tracked objects in accordance with the computed level of deformation;
    wherein the at least one processor is further operative to compute a level of deformation by:
        computing a plurality of histograms of oriented gradients for a given tracked object in the plurality of frames;
        detecting at least one change in the plurality of histograms of oriented gradients over the plurality of frames for the given tracked object; and
        calculating a level of deformation for the given tracked object using a weighted function, such that a variable of the weighted function is the at least one detected change in the plurality of histograms of oriented gradients over the plurality of frames.

10. The apparatus of claim 9, wherein a given tracked object is classified as at least one of a person and a vehicle.

11. The apparatus of claim 9, wherein the at least one processor is further operative to compute at least one of a size vector for each of the one or more tracked objects, a velocity vector for each of the one or more tracked objects, and a location vector for each of the one or more tracked objects.

12. The apparatus of claim 11, wherein each of the one or more tracked objects are classified in accordance with a function of the size vector, the velocity vector, the location vector, and the level of deformation of a corresponding tracked object.

13. The apparatus of claim 12, wherein the at least one processor is further operative to adjust a class of a given tracked object in accordance with at least one of a time of day, an environment, and an observation that the given tracked object belongs to a specific class.

14. The apparatus of claim 9, wherein the weighted function accounts for one or more periods of non-movement of the given tracked object.

15. The apparatus of claim 9, wherein the level of deformation of the given tracked object is compared to one or more object deformation models.

16. The apparatus of claim 15, wherein the one or more object deformation models define a distribution of level of deformation for one or more object classes.

17. A system for classifying one or more objects in at least one video, the system comprising:
    an input component for obtaining the at least one video, such that the at least one video comprises a plurality of frames;
    a feature extractor for tracking one or more objects in the plurality of frames and computing a level of deformation for each of the one or more tracked objects in accordance with at least one change in a plurality of histograms of oriented gradients for a corresponding tracked object;
    an object classifier for classifying each of the one or more tracked objects in accordance with the computed level of deformation;
    an adaptation component for adjusting a class of a given tracked object in accordance with at least one of a time of day, an environment, and an observation that the given tracked object belongs to a specific class; and
    a calibration tool for calibrating a classification of the one or more tracked objects by at least one of partitioning at least one view associated with the at least one video into at least one region, such that the one or more tracked objects are classified in accordance with their location in reference to the at least one region, and defining at least one normalized size of the one or more tracked objects within at least one view associated with the at least one video in accordance with one or more object models, such that the one or more tracked objects are classified in accordance with the at least one defined normalized size.

18. A computer program product for classifying one or more objects in at least one video, wherein the at least one video comprises a plurality of frames, the computer program product comprising:
- a computer-readable storage medium;
- a first program instruction to track one or more objects in the plurality of frames;
- a second program instruction to compute a level of deformation for each of the one or more tracked objects in accordance with at least one change in a plurality of histograms of oriented gradients for a corresponding tracked object; and
- a third program instruction to classify each of the one or more tracked objects in accordance with the computed level of deformation, wherein the first, second, and third program instructions are stored on the computer-readable storage medium;

wherein the second program instruction to compute a level of deformation further comprises instructions to:
- compute a plurality of histograms of oriented gradients for a given tracked object in the plurality of frames;
- detect at least one change in the plurality of histograms of oriented gradients over the plurality of frames for the given tracked object; and
- calculate a level of deformation for the given tracked object using a weighted function, such that a variable of the weighted function is the at least one detected change in the plurality of histograms of oriented gradients over the plurality of frames.

* * * * *